H. BEAUCHAMP.
HYDRANT CUT-OUT VALVE.
APPLICATION FILED JUNE 26, 1911.
1,096,592.
Patented May 12, 1914.
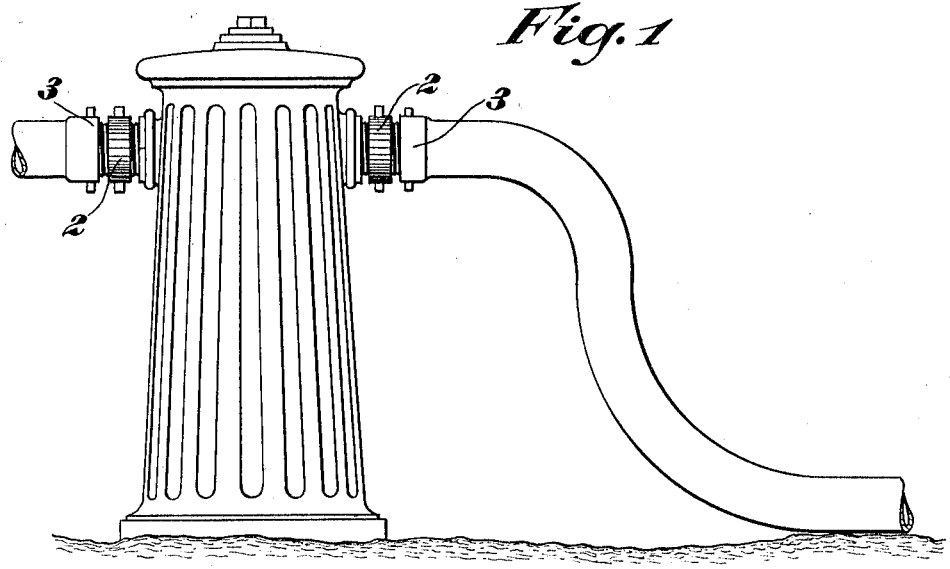
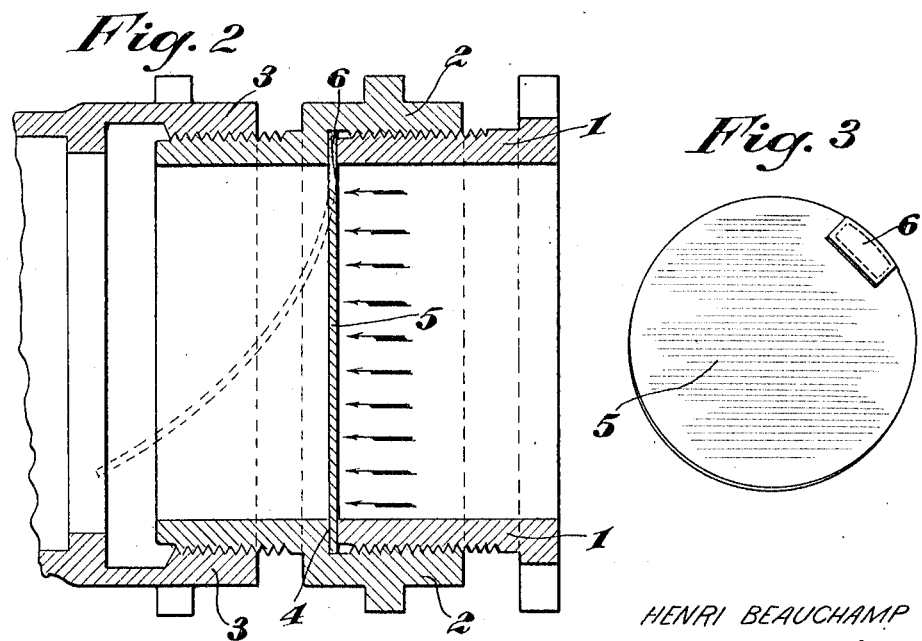
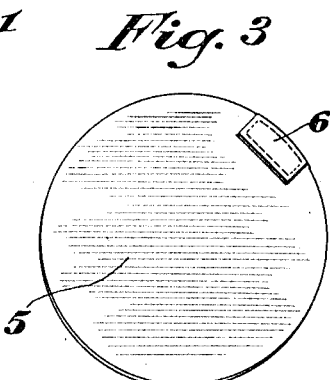
HENRI BEAUCHAMP
Inventor

UNITED STATES PATENT OFFICE.

HENRI BEAUCHAMP, OF MONTREAL, QUEBEC, CANADA.

HYDRANT CUT-OUT VALVE.

1,096,592.   Specification of Letters Patent.   Patented May 12, 1914.

Application filed June 26, 1911. Serial No. 635,427.

*To all whom it may concern:*

Be it known that I, HENRI BEAUCHAMP, a subject of the King of Great Britain, residing at No. 1431 St. Denis street, in the city of Montreal, Province of Quebec, Canada, have invented certain new and useful Improvements in Hydrant Cut-Out Valves; and I do hereby declare that the following is a full, clear, and exact description of the invention, such as will enable others skilled in the art to which it appertains to make and use the same.

The invention to be hereinafter described relates to hydrant couplings for fire hose.

In order to more clearly disclose the construction, operation, and use of the invention, reference should be had to the accompanying drawings forming part of the present application.

Throughout the several figures of the drawings like reference characters designate the same parts.

In the drawings: Figure 1 is a side elevation of the invention, as applied; Fig. 2 is an enlarged, central, vertical, longitudinal, cross section of the coupling; and Fig. 3 is a plan view of the disk removed.

The main objects of the invention are to provide a simple, compact, economical, efficient, and durable coupling by which a fire hose may be quickly and easily connected to a hydrant without the necessity of temporarily cutting off the supply of water to the other hose connected to the same hydrant, as is now the case.

Another object of the invention is the production of such a coupling which may be easily and quickly produced in large quantities and at a moderate cost.

Referring to the drawings in detail, 1 indicates the usual threaded connection or nipple, or pipe end, found on all fire hydrants. Removably mounted on this nipple is a coupling and clamping ring 2 provided with internal threads at one end to coöperate with the threads of the nipple 1, and having external screw threads at its opposite end to coöperate with the internal screw threads of the usual coupling ring 3 of a fire hose. Thus, the external threaded end of the ring 2 is substantially a duplicate of the nipple 1 and is adapted for use in the same way. The difference between the internal radii of the internally and externally threaded portions of the ring 2 is equal to the thickness of the wall of the nipple 1, thus leaving a shoulder 4 which abuts against the outer end of the nipple 1 when the ring 2 has been screwed as far as possible on the nipple. Thus, the nipple 1 and the outer portion of the ring 2 form practically one continuous pipe.

The main feature of the invention resides in a very strong flexible disk 5 of oiled leather, heavy oiled textile material, or the like. This disk is tightly clamped between the end of the nipple 1 and the shoulder 4 of the ring 2. When tightly clamped, in this manner, the disk 5 is adapted to adequately withstand the highest pressure of water passing from the hydrant through the nipple 1, at any time that the water is turned on. Thus, when the water is turned on full to all of the nipples 1, as is usual in connecting up fire hose, the disk 5 of each nipple will withstand the entire pressure in its nipple and no water will pass through any nipple until its particular disk is released. In order to release the disk of any particular nipple it is only necessary to slightly unscrew the ring 2 and thus decrease the clamping or holding action of the shoulder 4. As soon as this is done the disk will be bent outwardly by the water pressure, to the position shown in dotted lines in Fig. 2, or farther, thus permitting the water to rush through the nipple and into the hose which, of course, has been previously coupled to the ring 2 in the usual manner. In order to prevent loss of the disk 5 it may be provided with a slightly thickened portion 6 in its edge. This extra thickness, of course, gives increased clamping or holding action at such point, so that the disk will not be freed at this point, as quickly as at the rest of its edge. Consequently, the disk will swing from such thickened portion, as a hinge, as shown in dotted lines. When the water has been turned off and the hose disconnected, the ring 2 may be completely removed and either a new disk substituted for the old one or the old one returned to its operative position. If desired, the disk 5 may be positively connected to the ring 2 by projecting pins, or rivets, or the like, at some point of its circumference, instead of forming the disk with the thickened portion 6; as will be evident.

By the above construction, it is evident that it is not necessary to either completely or partially cut off the flow of water through the hydrant in order to connect a second or subsequent hose thereto while one or more prior hose are connected to the hydrant. By oiling the disk 5, freezing around it is prevented. The outer end of the ring 2 may be closed with the usual cap, just as the nipples are usually closed.

As disclosed, in the drawings and specification, the invention is applied to a fire hydrant. It is clear however that the invention may be used with great benefit in a great many other applications. In fact, it is adaptable for use in practically any case where connection is desired between two pipes or the like.

It is thought that the operation and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

A diaphragm of leather or like material and two tube-sections, in combination with a screw threaded coupling-sleeve engaging said sections and normally holding said diaphragm detachably in position by clamping its peripheral part against one of said sections, but on release permitting one edge of said diaphragm to bend back out of its seat under pressure.

In witness whereof I have hereunto set my hand in the presence of two witnesses.

HENRI BEAUCHAMP.

Witnesses:
L. A. GAUVIN,
E. J. GAUVIN.

Copies of this patent may be obtained for five cents each, by addressing the "Commissioner of Patents, Washington, D. C."